United States Patent [19]

Rapoport

[11] Patent Number: 5,295,019
[45] Date of Patent: Mar. 15, 1994

[54] METHOD AND APPARATUS FOR COLOR SEPARATION WITH AN OPTICAL SLAB AND ROOF PRISM

[75] Inventor: William R. Rapoport, Bridgewater, N.J.

[73] Assignee: Allied-Signal Inc., Morris Township, Morris County, N.J.

[21] Appl. No.: 822,223

[22] Filed: Jan. 17, 1992

[51] Int. Cl.⁵ .......................... G02B 27/10; G02B 5/04
[52] U.S. Cl. .................................... 359/634; 359/638; 359/639; 359/836
[58] Field of Search ............... 359/634, 629, 638, 639, 359/640, 583, 589, 836

[56] References Cited

U.S. PATENT DOCUMENTS 3,419,898  12/1968  Baldwin et al. .................. 359/629
3,817,624   6/1974  Martin ............................... 359/638

Primary Examiner—Jon W. Henry
Attorney, Agent, or Firm—Gerhard H. Fuchs; Richard C. Stewart

[57] ABSTRACT

Method and apparatus for separating a mixed frequency light beam, particularly a laser light beam, into its different frequency components by impinging it on a first surface of an optical slab which reflects one component but transmits another, and re-directing the reflected component via a roof prism to a second surface of the slab which is adjacent to and positioned 90° to the first surface, to obtain a reflected beam which is co-directional with the mixed beam, but stripped of the transmitted component.

10 Claims, 3 Drawing Sheets

METHOD AND APPARATUS FOR COLOR SEPARATION WITH AN OPTICAL SLAB AND ROOF PRISM

BACKGROUND OF THE INVENTION

Separation of spectral components from light beams composed of distinctly different frequencies, such as mixed beams resulting from second harmonic generation in laser beams, poses severe challenges to optical designers. Filters are unsuitable for high power applications, because of optical damage. Conventionally employed systems relying on selective reflection and/or diffraction are complex and require a multitude of elements which, in the aggregate, are bulky; in addition, they require critical alignment.

SUMMARY OF THE INVENTION

This invention solves the problems of complexity, bulk and alignment by providing, in its first aspect, a method of separating a mixed light beam comprising a first and a second spectral component into its spectral components, which involves the steps of (a) impinging the mixed light beam against the first surface of an optical slab having first and second reflective surfaces on adjacent sides, said surfaces being provided with a coating which is reflecting the first spectral component, but transmitting the second spectral component, to direct the reflected component into a roof prism, and (b) passing the reflected first spectral component through the roof prism to reverse its direction and to impinge it against the second reflective surface of the optical slab, so that it is reflected therefrom co-directional with the mixed light beam. The second spectral component enters the optical slab at the first reflective surface, and passes through the slab to be emitted at a point different from the point of impingement of the reflected spectral component, for recovery, if desired.

In its second aspect, the present invention provides an apparatus for separating a mixed light beam comprising first and second spectral components into its spectral components, which apparatus comprises, in combination:

(a) an optical slab having first and second reflective surfaces on adjacent sides, which surfaces have a coating which is reflecting the first spectral component, but transmitting the second spectral component; and (b) a roof prism in association with the optical slab positioned to receive the light beam which is reflected from the first reflective surface, and to direct it against the second reflective surface.

Typically, the mixed frequency beams result from non-linear frequency conversion of laser beams, e.g. from second, third and higher harmonic generation; stimulated Raman shifting; optical parametric oscillation; and the like. Usually, it is the output of a second harmonic generating (SHG) crystal. The coating which is reflective for the first spectral component and transmissive for the second spectral component desirably is dichroic coating, as is conventional.

DETAILED DESCRIPTION OF THE INVENTION

In all of the drawings, the invention is illustrated by the example of a two-component beam, wherein one frequency is schematically designated by dashes, and the other by dots.

Figure 1:
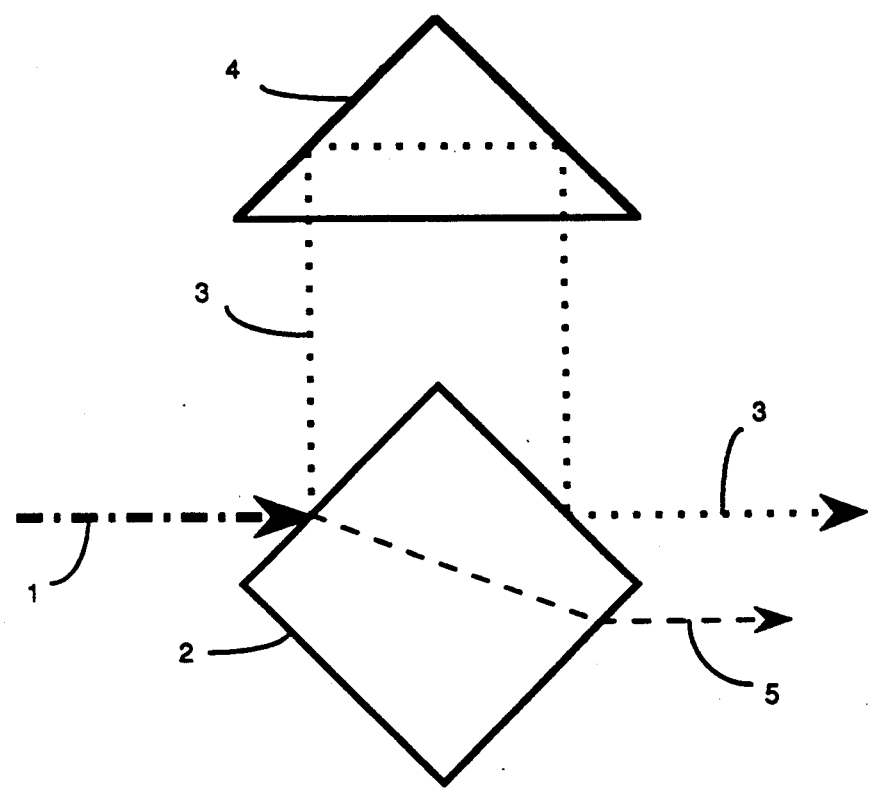
FIG. 1 is a schematic diagram of apparatus of the present invention illustrating the principal of operation, indicating the paths of the mixed and separated frequency beams.

With reference to FIG. 1, a mixed frequency light beam (1), as may typically be obtained by passing the fundamental frequency of a laser beam through a second harmonic generating (SHG) crystal, strikes the first reflective surface of optical slab (2), typically, but not necessarily, at an angle of about 45°. The first reflective surface is coated to be reflective for the second harmonic (doubled) frequency generated in the SHG crystal, but transparent for the fundamental frequency. Typically, the coating is a dichroic coating. Such coatings are conventionally available and may have reflectivity greater than 99.8% at the second harmonic, and greater than 90° transmission at the fundamental frequency. The second harmonic (3) is reflected from the first reflective surface and becomes incident on the surface which is represented by the hypotenuse of roof prism (4) (the base surface). The base surface is desirably, but not necessarily, provided with an anti-reflection coating to prevent or reduce scatter and stray beams. Beam (3) undergoes total internal reflection within roof prism (4) before exiting the base surface. The beam has now changed its direction 180° from its entrance into roof prism (4). This angle is insensitive to the rotation of roof prism (4) about its apex; it is also insensitive to translation of the prism. In either case, the beam will be shifted parallel to the original path, while the angular relations are maintained. Second harmonic beam (3) coming from roof prism (4) now is reflected from the second reflective surface of optical slab (2), which desirably, but not necessarily, is provided with the same type of reflective/transmissive coating as is the first reflective surface to obtain optimum color separation. The second harmonic beam now has the trajectory of the original mixed beam.

The fundamental frequency in mixed frequency beam (1) that is impinged on the first reflective surface of optical slab (2) is not reflected but enters the optical slab (2), wherein it is refracted and transverses slab (2) as fundamental beam (5) to exit slab (2) at a point which is physically separated from that at which the second harmonic beam (3) is reflected from the second surface. Thus, the fundamental and second harmonic frequencies are now spatially separated and available for separate use.

Figure 2:
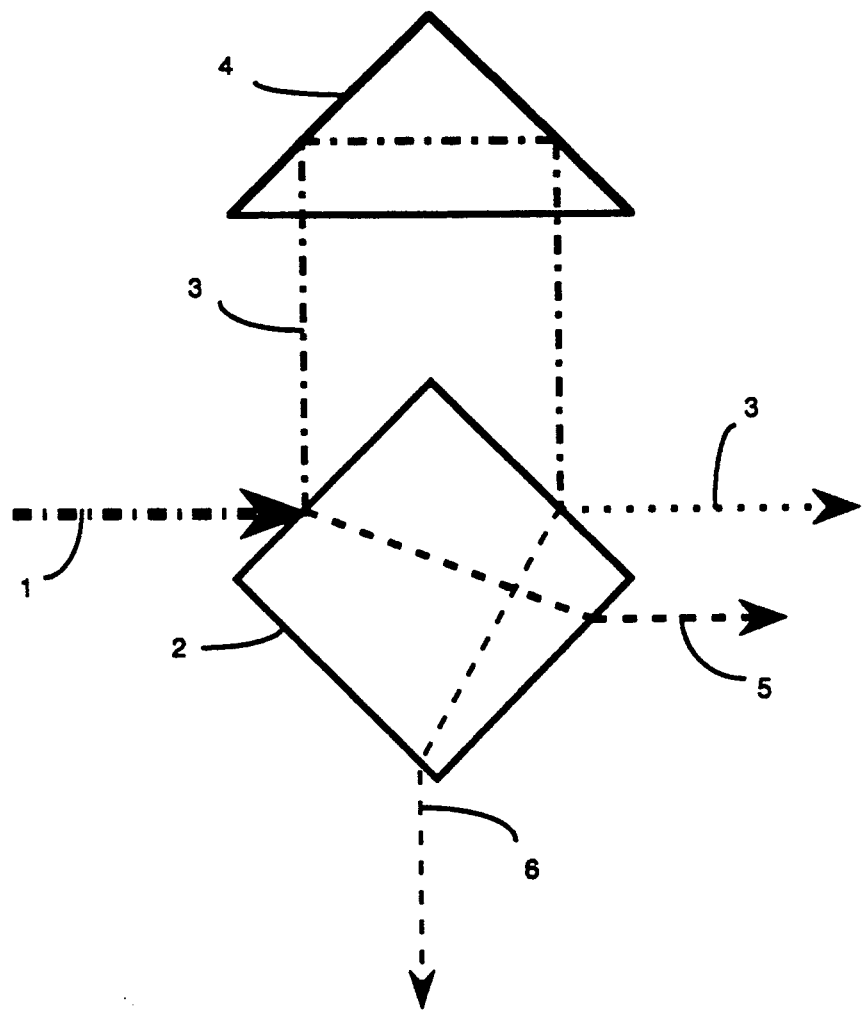
FIG. 2 is a diagram as in FIG. 1, illustrating further separation of the beams as may be achieved in practical operation.

Desirably, both reflective surfaces of optical slab (2) will be provided with a coating reflective for the second harmonic but transparent for the fundamental frequency. As can be seen from FIG. 2, remaining minor portions of the fundamental frequency still present in beam (3) at impingement on the second reflective surface will not be reflected but will enter slab (2), so that upon reflectance from the second reflective surface beam (3) is substantially stripped of the fundamental frequency. Separation efficiency depends on transmittance of the coating and corresponds to the square of the percent transmission (assuming both coatings have the same transmittance).

Figure 3:
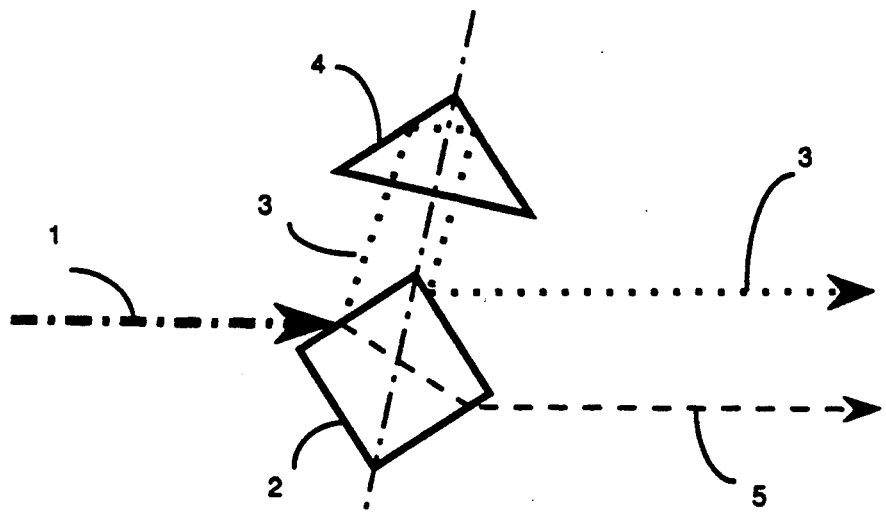
FIGS. 3a through 3c schematically demonstrates insensitivity of the invention apparatus to rotational displacement with respect to the axis of the incoming beam.
Figure 3:
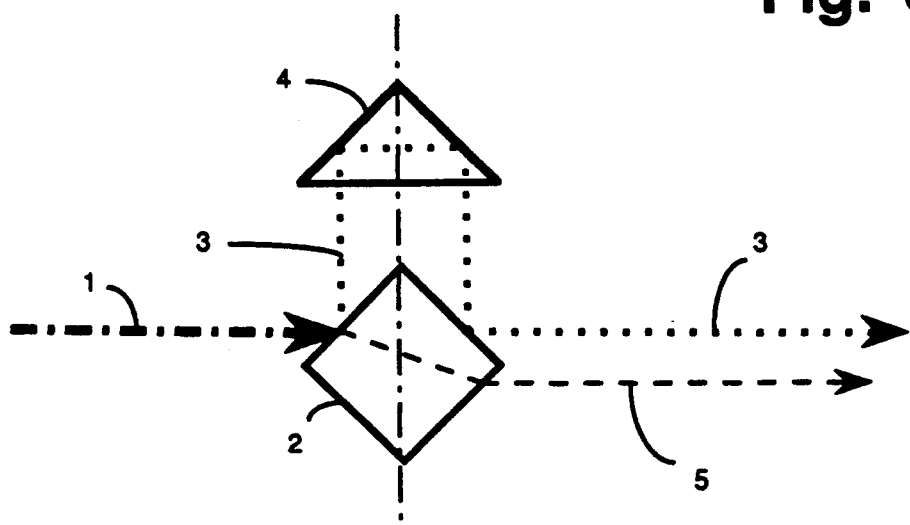
Figure 3:
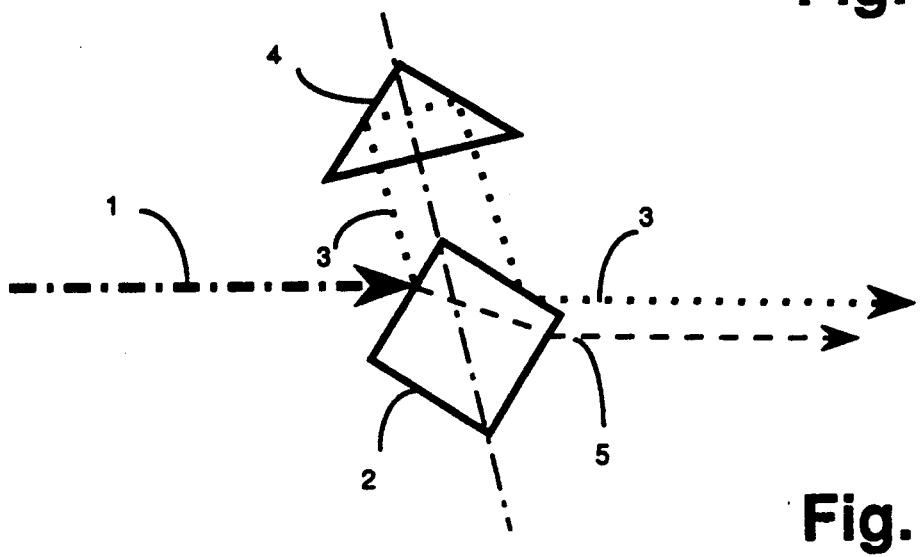

While, for the sake or simplicity, it is preferred to employ optical slab and a roof prism wherein in each the reflecting surface are arranged at an angle of 90° with respect to each other, other angles can be utilized. For example, if in the optical slab the reflecting surfaces are arranged at an angle less then 90°, the beams reflected from the first and returned to the second reflective surface will not be parallel, but will be divergent. However, by use of a prism having appropriately selected interiorly reflective surfaces, the beam from the prism can be directed such that it will impinge on the second reflective surface at the same angle with respect to the surface as the beam that was reflected from the first reflective surface. This can be accomplished by appropriate selection of the angle of the reflective surfaces in the roof prism, if necessary by provision of multiple reflective surfaces in the roof prism, e.g. by providing a 5-sided roof prism. The essential point is that within each, in the optical slab as well as in the roof prism, the reflecting surfaces are at fixed angles. Accordingly, in the specification and in the claims, the terms "optical slab" and "roof prism" are intended to cover any reflective/transparent optical body serving the above-described functions. Of course, the side or sides opposite the reflecting surfaces of the optical slab are not critical elements, so long as they do not cast the transmitted beam in a direction in which it would interfere with the reflected beam. A cube, for the sake of simplicity and effectiveness, is the preferred shape of the optical slab. Once an operable angular alignment between the slab and the prism has been established-—and that alignment is easily manipulated—it can be fixed, as by solidly mounting prism and slab in fixed relationship. So fixed with respect to each other, the prism/slab assembly is insensitive to rotation with respect to the angle of the input beam, as illustrated in FIGS. 3a through 3c While in the above description the frequency-doubled beam is reflected and the fundamental beam is transmitted, the opposite can be readily achieved by appropriate selection of the reflective/transparent coating.

I claim:

1. The method of separating a mixed light beam comprising a first and a second spectral component into its spectral components, comprising:
    (a) impinging said mixed light beam against the first surface of an optical slab having first and second reflective surfaces on adjacent sides, said surfaces being provided with a coating which is reflecting the first spectral component, but transmitting the second spectral component;
    (b) passing the reflected first spectral component through a roof prism to reverse its direction and to impinge it against the second reflective surface of said optical slab, so that it is reflected therefrom co-directional with the mixed light beam.

2. The method of claim 1 wherein the mixed light beam is a laser beam comprising a fundamental frequency and one or more frequencies generated by non-linear frequency conversion of the fundamental frequency.

3. The method of claim 2 wherein the mixed light beam is the output of a second harmonic generating crystal.

4. Apparatus for separating a mixed light beam comprising a first and a second spectral component into its spectral components comprising, in combination:
    (a) an optical slab having first and second reflective surfaces on adjacent sides, wherein at least the first reflective surface has a coating which is reflecting the first spectral component, but transmitting the second spectral component; and
    (b) a roof prism in association with said optical slab positioned to receive the light beam reflected from said first reflective surface and to direct it against said second reflective surface.

5. The apparatus of claim 4 wherein the said adjacent sides of said optical slab enclose an angle of 90° with respect to each other, and wherein the roof prism is a right angled prism.

6. The apparatus of claim 4 wherein the first and second reflective surfaces of said optical slab are both provided with a coating which is reflecting the first spectral component, but transmitting the second spectral component.

7. The apparatus of claim 4 wherein said coating is a dichroic coating.

8. The apparatus of claim 6 wherein said coating is a dichroic coating.

9. The apparatus of claim 4 further comprising a rigid mounting member whereon said optical slab and said roof prism are mounted in fixed relation to each other.

10. Apparatus for separating a mixed laser light beam from a second harmonic generating crystal comprising a fundamental frequency and shifted frequency into its spectral components comprising, in combination:
    (a) an optical slab having first and second reflective surfaces on adjacent sides which enclose an angle of 90° with respect to each other, wherein both reflective surfaces have a dichroic coating which is reflecting the shifted frequency, but transmitting the fundamental frequency; and
    (b) a right-angled roof prism in association with said optical slab positioned to receive the light beam reflected from said first reflective surface and to direct it against said second reflective surface; and
    (c) a rigid mounting member whereon said optical slab and said roof prism are mounted in fixed relation to each other.

* * * * *